(12) United States Patent
Wu et al.

(10) Patent No.: US 11,605,946 B2
(45) Date of Patent: Mar. 14, 2023

(54) AUTONOMOUS RESTORATION OF POWER SYSTEMS AFTER NATURAL DISASTERS

(71) Applicant: Siemens Aktiengesellschaft, Munich (DE)

(72) Inventors: Xiaofan Wu, North Brunswick, NJ (US); Ulrich Münz, Princeton, NJ (US); Joachim Bamberger, Stockdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 127 days.

(21) Appl. No.: 16/955,100

(22) PCT Filed: Aug. 30, 2018

(86) PCT No.: PCT/US2018/048661
§ 371 (c)(1),
(2) Date: Jun. 18, 2020

(87) PCT Pub. No.: WO2019/143386
PCT Pub. Date: Jul. 25, 2019

(65) Prior Publication Data
US 2021/0013737 A1 Jan. 14, 2021

Related U.S. Application Data

(60) Provisional application No. 62/618,315, filed on Jan. 17, 2018.

(51) Int. Cl.
*H02H 7/26* (2006.01)
*H02J 3/00* (2006.01)
(Continued)

(52) U.S. Cl.
CPC .......... *H02H 7/261* (2013.01); *G05B 19/042* (2013.01); *H02H 1/0092* (2013.01); *H02J 3/001* (2020.01);
(Continued)

(58) Field of Classification Search
CPC ...... H02J 13/00002; H02J 3/001; H02J 3/381; H02J 2203/10; H02J 2300/10;
(Continued)

(56) References Cited

U.S. PATENT DOCUMENTS 5,905,616 A * 5/1999 Lyke .................. H02H 7/30
361/64
5,973,899 A * 10/1999 Williams ............... H02H 3/063
361/72

(Continued)

FOREIGN PATENT DOCUMENTS

WO 2004040731 A1 5/2004

OTHER PUBLICATIONS

Australian Report of Exam dated Dec. 15, 2020; Application No. 2018403173; 9 pages.
(Continued)

*Primary Examiner* — Ziaul Karim

(57) ABSTRACT

Systems, methods, and computer-readable media are disclosed for autonomous restoration of power systems after natural disasters. An operating mode of a circuit breaker that is in a power system grid and that is coupled to other circuit breakers in the power system grid via communication channels is determined. Based on determining that the operating mode is a normal operating mode, data to parameterize a plurality of power grid restoration scenarios is collected at the circuit breaker. Based on determining that the operating mode is an exception mode, measurement data that includes current and voltage data is received at the circuit breaker,
(Continued)

and one of the power system grid restoration scenarios is initiated at the circuit breaker. The power system grid error restoration scenario is selected based at least in part on a status of the plurality of communication channels coupled to the circuit breaker and on the measurement data.

19 Claims, 9 Drawing Sheets

(51) Int. Cl.
*H02J 13/00* (2006.01)
*G05B 19/042* (2006.01)
*H02H 1/00* (2006.01)
*H02J 3/38* (2006.01)

(52) U.S. Cl.
CPC ........ *H02J 3/381* (2013.01); *H02J 13/00002* (2020.01); *G05B 2219/2639* (2013.01); *H02J 2203/10* (2020.01); *H02J 2300/10* (2020.01); *H02J 2300/24* (2020.01); *H02J 2300/28* (2020.01)

(58) Field of Classification Search
CPC .............. H02J 2300/24; H02J 2300/28; G05B 19/042; G05B 2219/2639; H02H 1/0092; H02H 7/261; H02H 7/263; Y02E 10/56; Y02E 60/00; Y04S 10/20
See application file for complete search history.

(56) References Cited

U.S. PATENT DOCUMENTS

| | | | |
|---|---|---|---|
| 2009/0112375 A1* | 4/2009 | Popescu | H02H 1/0092 700/286 |
| 2009/0184835 A1* | 7/2009 | Deaver, Sr. | H02J 13/00009 340/660 |
| 2009/0206059 A1* | 8/2009 | Kiko | H02J 13/00017 218/143 |
| 2011/0066296 A1* | 3/2011 | Nelson | H02H 1/0092 700/286 |
| 2013/0091258 A1* | 4/2013 | Shaffer | H02J 3/00 709/224 |
| 2013/0144768 A1* | 6/2013 | Rohrbaugh | H01H 9/168 340/638 |
| 2013/0231756 A1* | 9/2013 | Houdray | B23P 6/00 700/79 |
| 2016/0225562 A1* | 8/2016 | Franks | H02H 3/08 |

OTHER PUBLICATIONS

International Search Report dated Nov. 19, 2018; International Application No. PCT/US2018/048661; 13 pages.
Nagata T et al: "A new power system restoration framework by means of multi-agent approach", IEEE/PES Transmission and Distribution Conference and Exhibition 2002: Asia Pacific. Yokohama, Japan, Oct. 6-10, 2002; [IEEE/PES Transmission and Distribution Conference and Exposition], New York, NY: IEEE, US, vol. 3, Oct. 6, 2002 (Oct. 6, 2002), pp. 1695-1700, XP010630136 / Oct. 6, 2002.
Sampaio, R. et al; "Automatic restoration system for power distribution networks based on multi-agent systems"; IET Generation, Transmission & Distribution; vol. 11 No. 2; pp. 475-484.

* cited by examiner

| SCENARIOS | DESCRIPTIONS | |
|---|---|---|
| SHORT CIRCUIT (DETECTED BY A SEVERE VOLTAGE DROP FOR SEVERAL SECONDS AS SOON AS THE BREAKER IS CLOSED) | CIRCUIT BREAKER REMAINS OPEN ONCE IT DETECTS SHORT CIRCUIT | DETECT SHORT CIRCUIT AND REMAINS OPEN — SHORT CIRCUIT |
| OVERLOAD (DETECTED BY A MINOR VOLTAGE DROP COMPARED TO THE SHORT CIRCUIT CASE) | CIRCUIT BREAKER REMAINS OPEN UNTIL THE NON-ENERGIZED SIDE OF THE GRID IS ENERGIZED FROM ANOTHER BREAKER OR THE GENERATION ON THE ENERGIZED SIDE HAS INCREASED, E.G. BY ADDITIONAL PV GENERATION | DETECT OVERLOADING AND DECIDES IF OPEN OR CLOSED DEPENDING ON SYSTEM STATUS — LARGE LOAD |
| LOAD/GENERATION BALANCE | CIRCUIT BREAKER REMAINS CLOSED AND CONTINUES NORMAL OPERATION | BREAKER IS CLOSED DURING NORMAL OPERATION — NORMAL LOAD |

FIG. 6

AUTONOMOUS RESTORATION OF POWER SYSTEMS AFTER NATURAL DISASTERS

CROSS-REFERENCE TO RELATED APPLICATION

This application is a national phase filing under 35 U.S.C. 371 of International Patent Application No. PCT/US2018/048661, filed Aug. 30, 2018, which claims the benefit of priority to U.S. Provisional Patent Application Ser. No. 62/618,315, filed on Jan. 17, 2018, which are herein incorporated by reference in their entirety.

BACKGROUND

The present invention relates generally to power systems and, more specifically, to autonomous restoration of power systems after natural disasters.

It is important to restore power as quickly as possible after a power blackout, due for example to a natural disaster, in order to avoid additional hardships caused by a lack of heating or cooling or food. Researchers studying power restoration have focused on how to recover power systems quickly, efficiently, and safely in order to reduce financial losses. Power system recovery is a multi-objective, multi-phase, multi-variable control and optimization problem with both high complexity and high levels of uncertainty. In recent years, efforts have been made to improve the level of autonomy in the power system recovery process by using new technologies in the areas of advanced optimal control, distributed optimization, communication networks, digital twins, and artificial intelligence.

Contemporary power restoration strategies generally emphasize responses to generator and transmission contingencies where an optimization algorithm is used for power flow analysis and an expert system is used to construct the supporting tool for control decision making. For regional distribution systems, control of multi-agent system techniques have been developed to address local load restoration. In addition, as a functional extension of expert systems and heuristic rules, decision support systems can also have a role in contemporary strategies.

Accordingly, while power restoration processes are suitable for their intended purposes, what is needed is a power restoration process having certain features of embodiments of the present invention.

SUMMARY

According to one or more embodiments of the present invention, autonomous restoration of power systems after natural disasters is provided. A non-limiting example method includes determining, at a circuit breaker, an operating mode of the circuit breaker. The circuit breaker is in a power system grid that includes a plurality of circuit breakers and a plurality of power generation units. The circuit breaker is one of the plurality of circuit breakers, and the plurality of circuit breakers are coupled to each other via a plurality of communication channels. The operating mode of the circuit breaker is one of a normal operating mode and an exception operating mode. Based on determining that the circuit breaker is in the normal operating mode, data to parameterize a plurality of power system grid restoration scenarios is collected at the circuit breaker. Based on determining that the operating mode is the exception mode, measurement data that includes current and voltage data is received at the circuit breaker, and one of the plurality of power system grid restoration scenarios is initiated at the circuit breaker. The power system grid restoration scenario is selected based at least in part on a status of the plurality of communication channels coupled to the circuit breaker and on the measurement data.

Other embodiments of the present invention implement the features of the above-described methods in computer systems and in computer program products.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 6 is a table of possible exception operating modes of a circuit breaker of FIG. 4 in accordance with one or more embodiments of the present invention.

DETAILED DESCRIPTION

Figure 1:
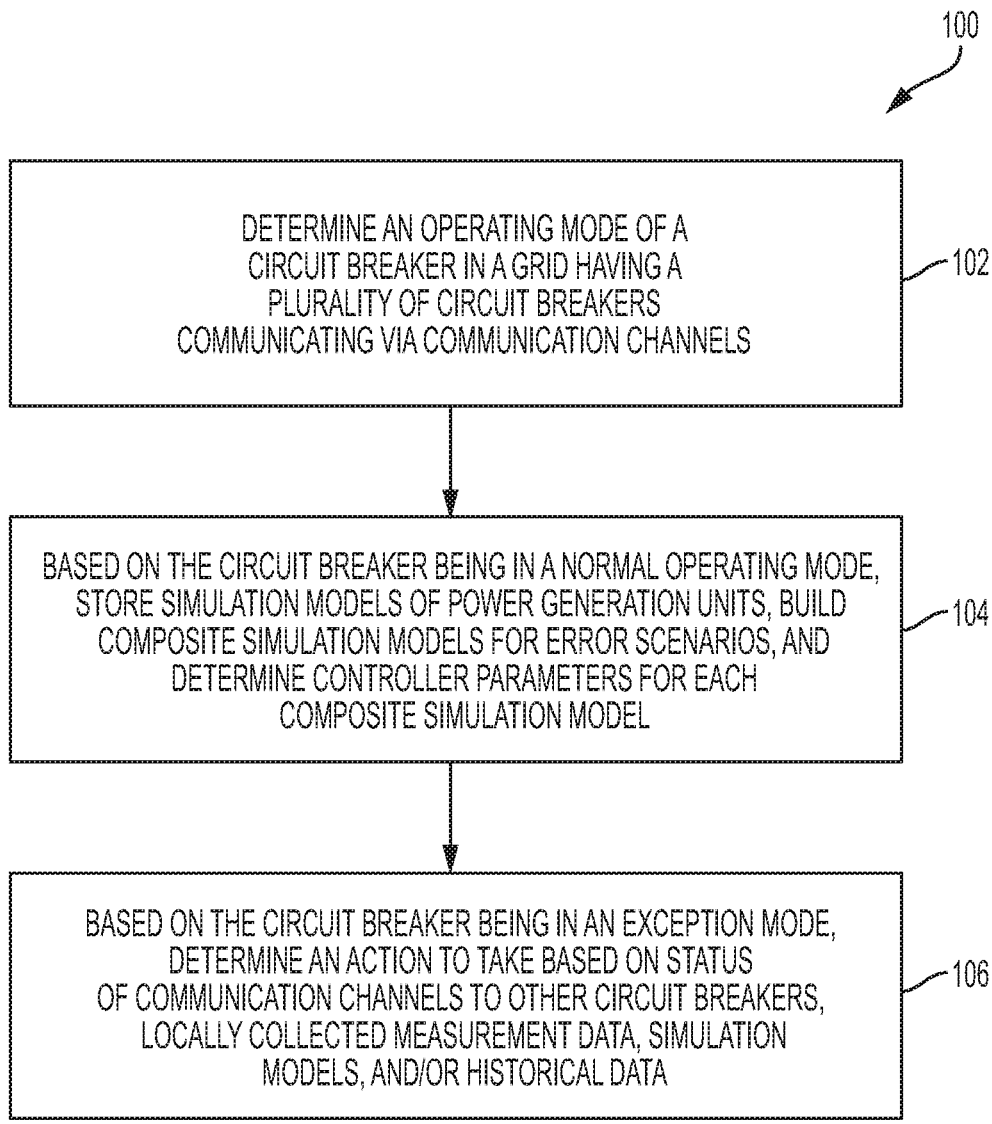
FIG. 1 is flow diagram of a process of autonomous restoration of power systems in accordance with one or more embodiments of the present invention.

One or more embodiments of the present invention provide a new approach to recovering a power system by combining smart circuit breaker technology with automatic system identification, communication-free control, and controller tuning techniques. One or more embodiments of the present invention focus on restoration of distributed systems, however embodiments are not limited to restoration of distributed systems and can be extended to transmission systems. One or more embodiments of the present invention described herein focus on recovering a power system on a distribution level with different types of power generation units available (e.g., diesel generators, batteries, wind power, photovoltaic, etc.). In these one or more embodiments of the present invention it is assumed that smart circuit breakers are installed at certain locations of the grid and that wireless communication between them is available during normal operation.

As used herein, the term "power system" or "power system grid" refers to a group of interconnected components that include power sources (also referred to herein as "power generation units") and circuit breakers.

As used herein, the term "smart circuit breaker" refers to a circuit breaker that also includes features such as wireless connectivity and computing power (e.g., computing device and/or processor component).

One or more embodiments of the present invention require less manual calibration work for field engineers when compared to existing solutions for restoring power systems. In addition, one or more embodiments of the present invention utilize smart circuit breakers to ensure system stability and safety during power restoration. Further, faster power recovery can be provided by one or more embodiments of the present invention when compared to existing solutions for power recovery by making digital twins, or simulation models, available for system modeling and controller tuning; and/or by allowing component availability to be automatically detected by smart circuit breakers.

One or more embodiments of the present invention provide a technological improvement over existing solutions that typically require user input to restore a power system. A disadvantage of requiring user input is that it can take longer to restore power as the power system grid may remain inoperable as the person is gathering and analyzing information in order to determine what steps to take to restore the power system grid. The ability to automatically restore a power system without user input is addressed by one or more embodiments of the present invention by programming smart circuit breakers to operate either collaboratively via wireless communication channels or to operate individually based only on local measurements and pre-stored information collected, for example when the smart circuit breakers are operating collaboratively. In accordance with one or more embodiments of the present invention, computer code executing on a processor(s) of a smart circuit breaker is able to evaluate the balance between load and generation, detect power generation unit availability, and smartly decide whether to open or close depending on different scenarios. Embodiments of the smart circuit breakers described herein provide for smooth transitions between different phases and different control schemes.

One or more embodiments of the present invention provide a technological improvement over existing solutions that typically require centralized coordination between circuit breakers in a power system grid in order to restore the power system gird. A disadvantage of requiring centralized coordination between the circuit breakers is that communication channels between the circuit breakers are often not available when a power outage occurs. Exemplary embodiments of the present invention provide technical solutions to these disadvantages of existing solutions by identifying simulation models, or digital twins, of the key grid-forming power generation units in the power system grid. These simulation models are identified during normal operation and stored locally at the smart circuit breakers. This allows autonomous decentralized communication-free control during a black-start and also allows online optimal controller tuning when communication is partially recovered. As used herein, the term "black-start" refers to restoring the power system grid to operation without relying on the external electric power transmission network to recover from a total or partial shutdown. Online optimal controller during refers to techniques that automatically determine the parameters of the controllers when a system operating point changes.

The decentralized communication-free control schemes implemented by one or more embodiments of the prevent invention can be executed during a black-start to energize individual regions of a power system grid. Combining these schemes with smart circuit breaker techniques of relying on historical data can provide a more stable restoration when compared to existing approaches due at least in part to being able to effectively avoid circumstances like short circuits and overloading. In addition, as described herein, the restoration approach of one or more embodiments of the present invention can be used to maintain a functional distribution grid even if communication between the smart circuit breakers is not recovered.

Three different phases are utilized by one or more embodiments of the present invention to perform the restoration of a power system including pre-event actions during normal operations, post-event actions when communication channels between the circuit breakers are not available and post-event actions which occur when at least a subset of the communication channels between the circuit breakers is available. The event causing the power outage can include, but is not limited to a natural disaster.

Turning now to FIG. 1, a flow diagram 100 of a process of autonomous restoration of power systems is generally shown in accordance with one or more embodiments of the present invention. The processing shown in FIG. 1 can be performed by a smart circuit breaker in a power system grid such as that shown in FIG. 2 below. At block 102, an operating mode of the circuit breaker is determined. The determining can include, but is not limited to checking to see if communication channels between the circuit breaker and other circuit breakers in the power system grid are available. In accordance with one or more embodiments of the present invention, if all of the communication channels are available, then the circuit breaker is in normal operating mode; and otherwise the circuit breaker is operating in an exception mode.

Block 104 of FIG. 1 is performed based on the circuit breaker being in a normal operating mode. During the normal operating mode the circuit breaker works collaboratively with the other circuit breakers to share simulation models, or digital twins, of the power generation units in the power system grid. The shared simulation models are stored at the circuit breaker and the circuit breaker combines the simulation models to build a composite simulation model for possible error scenarios which can also be stored at the circuit breaker. The circuit breaker runs automatic controller tuning functions for each of the composite simulation models that represent the different error scenarios and stores the resulting optimized controller parameters as historical data. The tuning functions can be performed for example using H-infinity optimization. One or more embodiments of the processing performed at block 104 of FIG. 1 are described below with reference to FIGS. 2 and 3.

Block 106 of FIG. 1 is performed based on the circuit breaker being in an exception mode. The circuit breaker is in an exception mode when at least a subset of the communication channels between the circuit breaker and other circuit breakers in the power system grid are not available. At block 106, the circuit breaker determines what action to take based on whether communication channels to other circuit breakers are available, locally collected measurement data (e.g., current and voltage), the stored simulation models, and/or the historical data. In accordance with one or more embodiments of the present invention, the circuit breaker performs the measurements to obtain at least a subset of the measurement data. In accordance with one or more embodiments of the present invention, a device external to the circuit breaker performs the measurements to obtain at least a subset of the measurement data. The collected data can be stored in computer memory located on the circuit breaker. Embodiments of the processing performed at block 106 of FIG. 1 are described below with reference to FIGS. 4-8.

In accordance with one or more embodiments of the present invention, the processing in blocks 102, 104, and 106 are repeated (e.g., on a periodic basis or based on a detected event) while the circuit breaker is operational.

Figure 2:
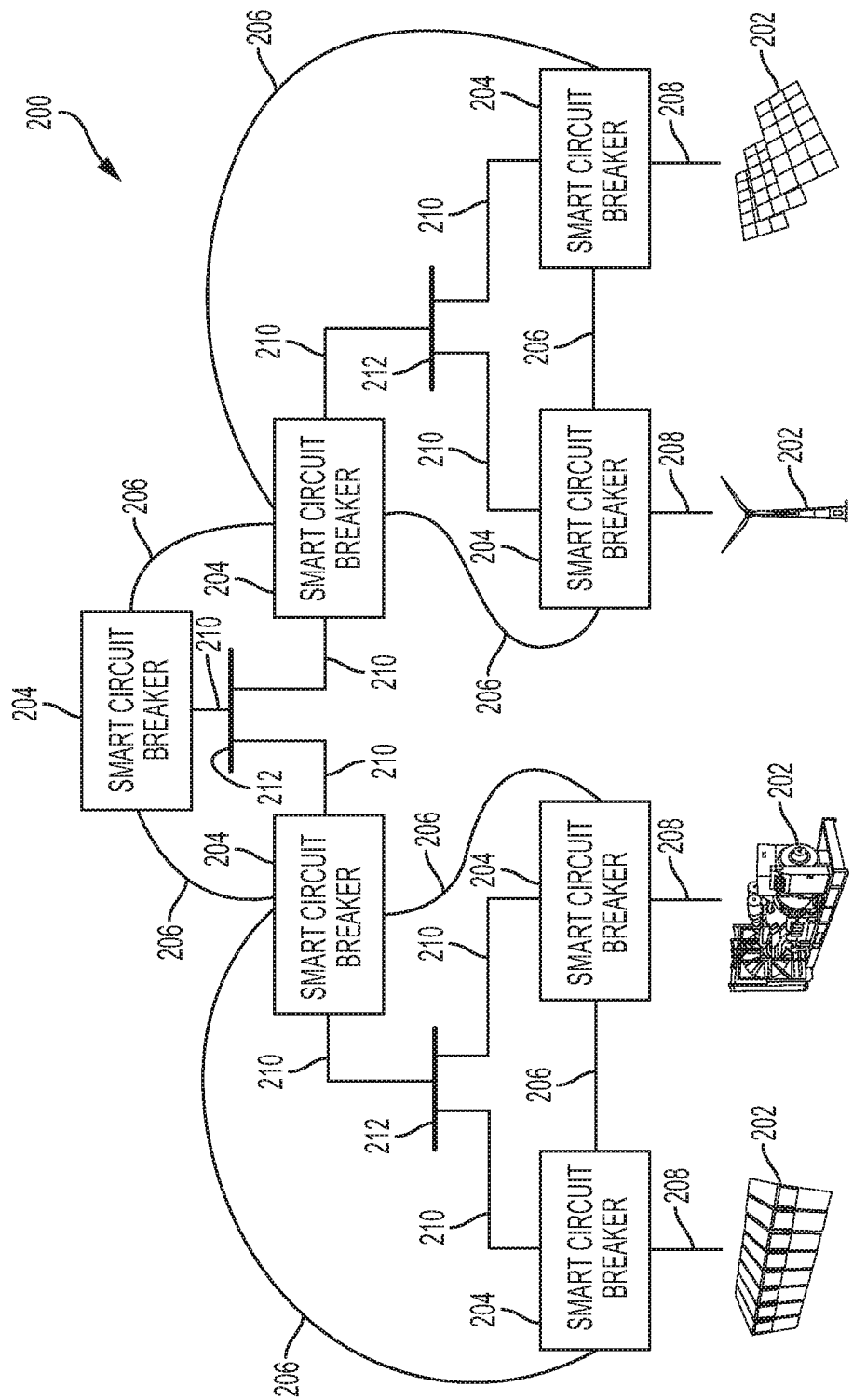
FIG. 2 is a schematic block diagram of a power system grid operating in a normal operating mode in accordance with one or more embodiments of the present invention.

Turning now to FIG. 2, a schematic block diagram of a power system grid 200 operating in a normal operating mode is generally shown in accordance with one or more embodiments of the present invention. The power system 200 shown in FIG. 2 includes power generation units 202, smart circuit breakers 204, feeder power lines 208 connecting the power generation units 202 and the smart circuit breakers 204, functional wired and/or wireless communication channels 206 between the smart circuit breakers 204, functional power lines 210 and power line connectors 212. The power system grid 200 also contains loads which are not shown in FIG. 2 to simplify the illustration. The power generation units 202, or power sources, providing power to the feeder power lines 208 can include, but are not limited to diesel generators, batteries, solar power, and wind power. As shown in FIG. 2, during normal operating mode, the power lines and wireless communication channels are fully functional.

Figure 3:
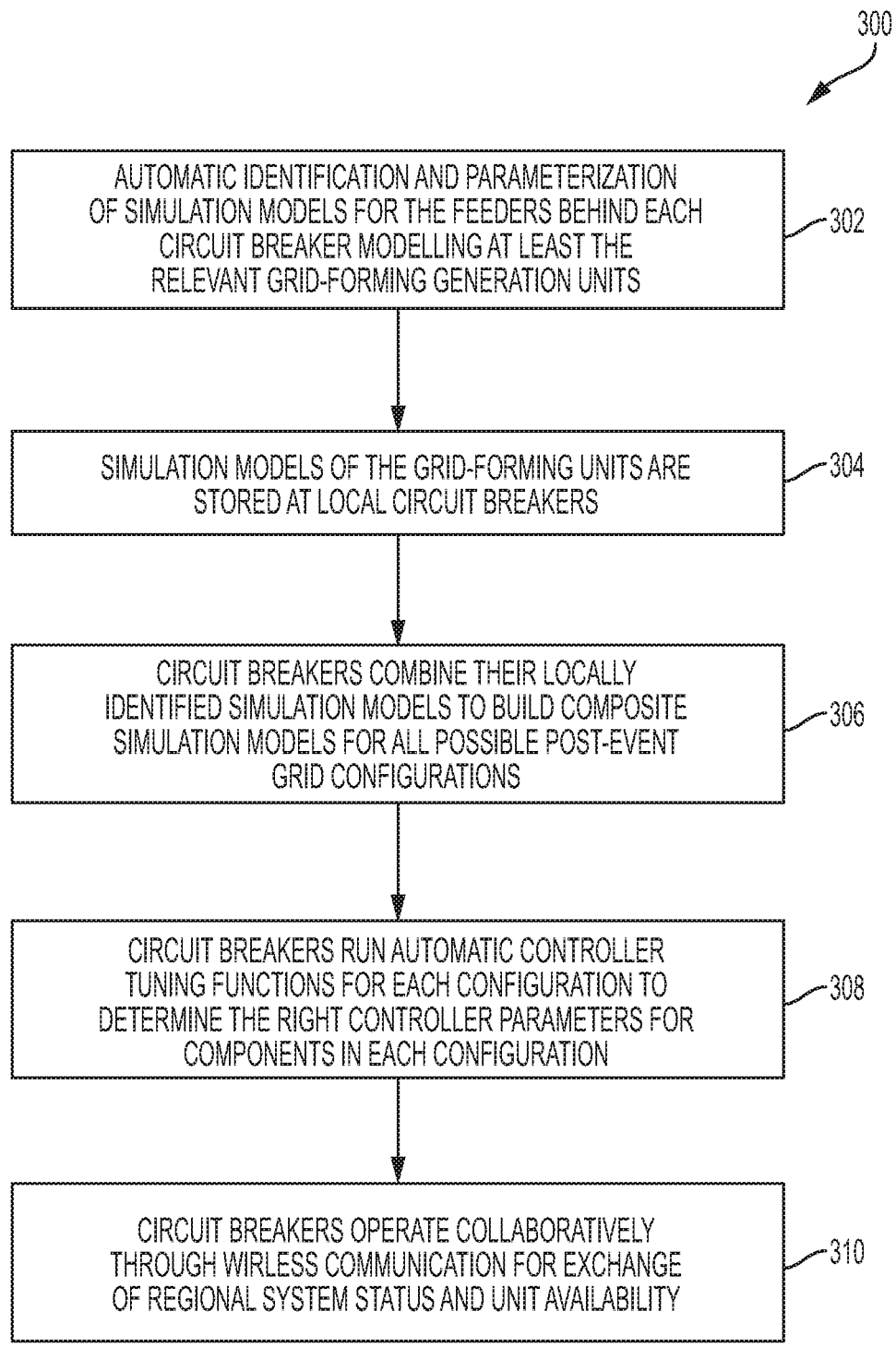
FIG. 3 is a flow diagram of processing performed by a circuit breaker operating in a normal mode in accordance with one or more embodiments of the present invention.

Turning now to FIG. 3, a flow diagram 300 of processing performed by a circuit breaker, such as a smart circuit breaker 204 of FIG. 2, is generally shown in accordance with one or more embodiments of the present invention. At block 302, simulation models (also referred to as "digital twins") of the feeders, such as power generation units 202 of FIG. 2, behind each circuit breaker, such as smart circuit breakers 204 of FIG. 2, are automatically identified and parameterized. The simulation models can include, but are not limited to, data related to frequency, voltage, active power, and reactive power of the power generation units. Simulation models are identified based on system identification and parameter estimation techniques, where input and output data of the actual device is used to determine the values of the parameters for the simulation model. In accordance with one or more embodiments of the present invention, at least each of the relevant grid-forming generation unit include diesel generators, gas generators, different types of energy storages, and some power inverters with grid-forming capability. They are used to guarantee that the frequency of the system does not deviate too much from the nominal value (e.g., 60 Hz in the US, and 50 Hz in Europe) and they are modeled and parameterized. The modeling and parameterizing can be performed for example using any manner known in the art using, for example Kalman filters and/or synchrophasor measurements. The processing at block 302 can include, but is not limited to identification of the system parameters (e.g., PID control gains of the automatic voltage regulator, time constant of the low-pass filter, gain of the filter in the passband, etc,), local control gains of the important components in the feeder (e.g., generators, energy storages, inverters, etc.), and local impedance.

At block 304 of FIG. 3, the simulation models for all of the power generation units in the power system grid are stored in memory at each of the circuit breakers in the power system grid. The simulation models are regularly updated to adapt to changes and exchanged between the circuit breakers in the power system grid. At block 306, each of the circuit breakers in the power system grid combines their locally identified simulation model with simulation models from the other circuit breakers in the power system grid to build composite simulation models for all possible post-event grid configurations. A post-event grid configuration, or error scenario, is a post-event grid topology assuming that one or several of the smart circuit breakers remain open because its corresponding feeder (e.g., power generation unit) contains a short circuit or some other failure condition. In a simple example with two smart circuit breakers, there are four post-event grid configurations: both circuit breakers are closed; either one of the circuit breakers is open and the other is closed; and both circuit breakers are open.

At block 308 of FIG. 3, once the circuit breakers have built the composite simulation models, they run automatic controller tuning functions for each configuration to determine the right controller parameters for all (relevant) components in this configuration. The tuning functions can be performed for example using H-infinity optimization. Each composite simulation model and it corresponding controller parameters correspond to and can be used by a power system grid restoration scenario to autonomously restore power to the power system grid. If some controller parameters are not tunable (e.g. because the power generation unit does not have a corresponding communication channel or because the channel may be corrupted after the event), those parameters are not optimized. The resulting optimized controller parameters are stored in all of the circuit breakers in the power system grid, as historical data, such that after the event, the circuit breakers only have to identify the actual configuration and they can read the parameter(s) from their own local storages. In one or more alternate embodiments of the present invention, one set of controller parameters for all power generation units for all configurations is determined (i.e. an online identification of the configuration is not required in this case), however the stability reserve will be smaller in this case than if communication is available.

At block 310, the circuit breakers operate collaboratively through wireless communication channels for exchange of regional system status and power generation unit availability. Historical data is stored locally at each circuit breaker for use in restoring the power system grid after an event (e.g., a natural disaster). In accordance with one or more embodiments of the present invention, historical data can include controller parameters (also referred to herein as control parameters) for different power grid restoration, or operation, scenarios (e.g., inventors please add two or more examples of control parameters, PID control gains for exciter in a diesel generator, PID control gains for governor in a diesel generator, droop control gains for either a generator or an inverter) can be stored in a look-up table for use when restoring the power system after an event such as a blackout.

Figure 4:
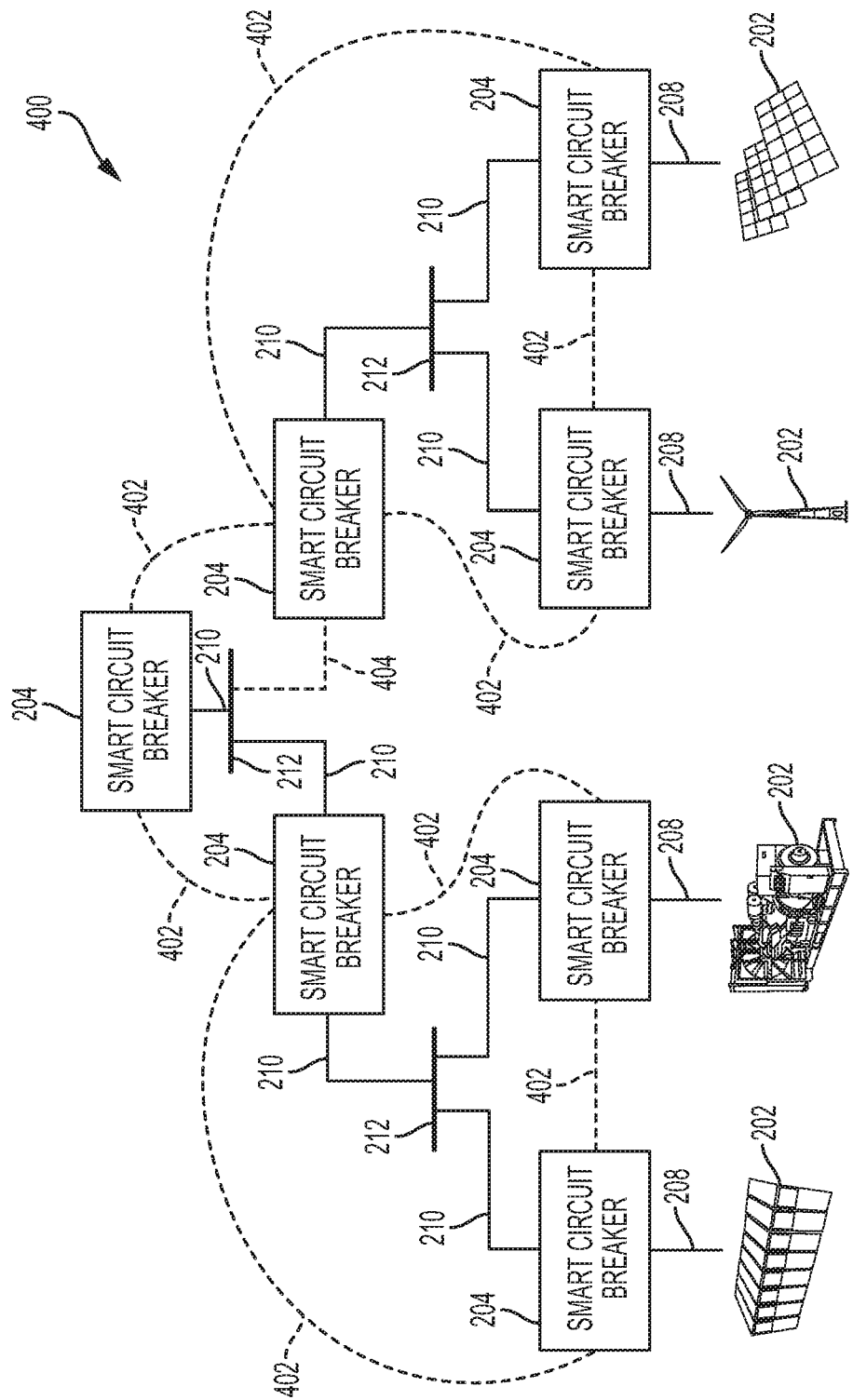
FIG. 4 is a schematic block diagram of a power system grid operating without communication between circuit breakers in accordance with one or more embodiments of the present invention.

Turning now to FIG. 4, a schematic block diagram of a power system grid 400 operating without communication between circuit breakers is generally shown in accordance with one or more embodiments of the present invention. The power system grid 400 of FIG. 4 represents the power system grid 200 of FIG. 2 after the communication channels 206 and one or more of the power lines 210 are short circuited for example, after a blackout. In accordance with one or more embodiments of the present invention, when these outages occur, the power generation units 202 continue to operate using a decentralized communication-free control strategy. The power system grid 400 shown in FIG. 4 includes: power generation units 202; smart circuit breakers 204; feeder power lines 208 connecting the power generation units 202 and the smart circuit breakers 204; lost, or non-functional wireless communication channels 402 between the smart circuit breakers 204; functional power lines 210; lost, or short circuited power line 404; and power line connectors 212.

Figure 5:
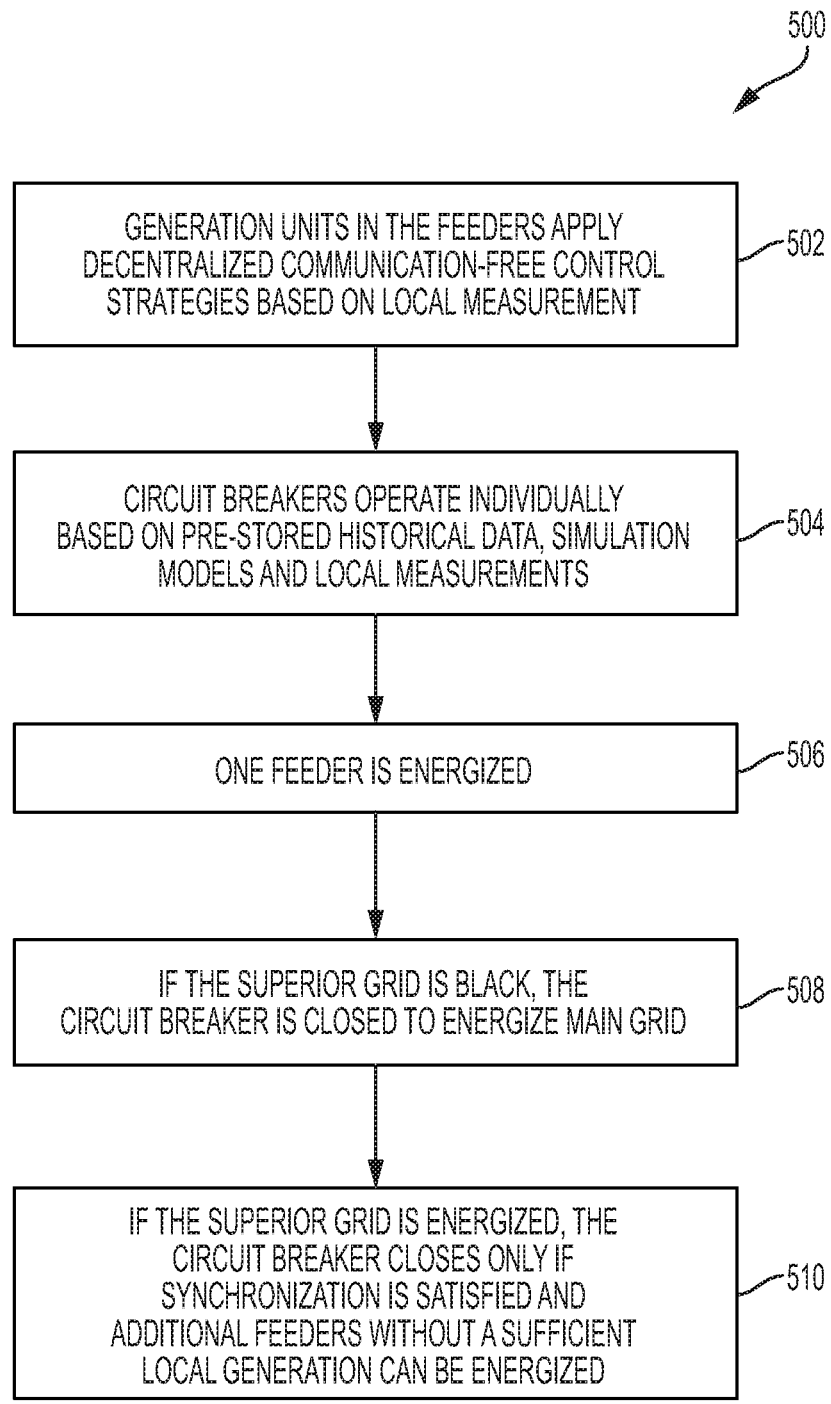
FIG. 5 is a flow diagram of a process performed by a circuit breaker operating without communication to other circuit breakers in accordance with one or more embodiments of the present invention.

Turning now to FIG. 5, a flow diagram 500 of a process performed by a circuit breaker, such as a smart circuit breaker 204 of FIG. 4, operating in the absence of communication with other circuit breakers, is generally shown in accordance with one or more embodiments of the present invention. At block 502, the generation units in the feeders, such as power generation units 202 of FIG. 4, continue to operate using a decentralized communication-free control strategy based on local measurements. At block 504, each circuit breaker in the power system grid, such as power system grid 400 of FIG. 4, operates individually based on the pre-stored historical data (e.g., control parameters for different operation scenarios), the previously shared simulation models, and local measurements (e.g., current and voltage). The circuit breakers can be used to ensure safe operation and smooth transitions between different control schemes and operation modes. In one or more embodiments of the present invention, all of the circuit breakers are open and those feeder lines, such as feeder power lines 208 of FIG. 4 that have sufficient local generators, such as power generation units 202 of FIG. 4, are energized by their local generators. In this case, the power generation units 202 start with those parameters that have been determined for the case when all power generation units are islanded. Note that if none of the feeder power lines has sufficient power generators to feed the local load at the respective circuit breaker than a black-start is not possible.

At block 506, at least one of the feeder power lines in the power supply grid is energized. This implies that either the superior grid (the higher level grid in a hierarchical distribution grid) is black or that the superior grid is already energized. If the superior grid is black, then processing continues at block 508. Alternatively, if the superior grid is already energized then processing continues at block 510. The distribution grid often has a tree structure, and the superior grid is the part of the distribution grid that is on a higher hierarchical level of the tree structure than the part of the distribution grid where the circuit breaker and its corresponding generation unit are located. The main grid refers to the transmission grid.

At block 508, the superior grid is black and the circuit breaker is closed to energize the superior grid. In accordance with one or more embodiments of the present invention, the circuit breaker operates in one of the exception modes shown below in the table of FIG. 6.

At block 510, the superior grid is energized and the circuit breaker closes only if synchronization is satisfied (i.e., when the voltage amplitude, phase and frequency on both sides of the circuit breaker are close to each other). If communication between the circuit breaker and the power generation units within its feeder power line is available, then the circuit breaker can actively change the set points for frequency and voltage control of the individual power generation unit to achieve the synchronization condition. In addition, the circuit breaker can adjust reactive and tertiary controls. Once the superior grid is energized, additional feeders without sufficient local generation can be energized. Therefore, in accordance with one or more embodiments of the present invention, the corresponding circuit breakers are closed (one after the other, not at the same time) and the circuit breakers operate in exception modes shown below in the table of FIG. 6. In accordance with one or more embodiments of the present invention, by prioritizing the closing of the circuit breakers (e.g., by indexing), it can be ensured that the feeders with more generation than load are connected first, to provide enough generation for the feeders with more load than generation.

Turning now to FIG. 6, a table 600 of possible exception operating modes of a circuit breaker, such as a smart circuit breaker 204 of FIG. 4, is generally shown in accordance with one or more embodiments of the present invention. Row 602 of table 600 describes an action for the circuit breaker to take when a short circuit condition is detected by the circuit breaker. The circuit breaker detects a short circuit by, for example, detecting a severe voltage drop for several seconds as soon as the circuit breaker enters a closed state. In accordance with one or more embodiments of the present invention, when a short circuit is detected, the circuit breaker remains in an open state. Row 604 of table 600 describes an action for the circuit breaker to take when an overload condition is detected by the circuit breaker. The circuit breaker detects a short circuit by, for example, detecting a minor (when compared to the short circuit condition) voltage drop. In accordance with one or more embodiments of the present invention, when an overload is detected, the circuit breaker remains in an open state until the non-energized side of the grid is energized from another circuit breaker or until the amount of power on the energized side has increased (e.g., by additional photovoltaic generation). Row 606 of table 600 describes an action for the circuit breaker to take when the circuit breaker detects that the load and generation are in balance. In accordance with one or more embodiments of the present invention, when the load and generation balance, the circuit breaker remains in a closed state and continues normal operation.

Figure 7:
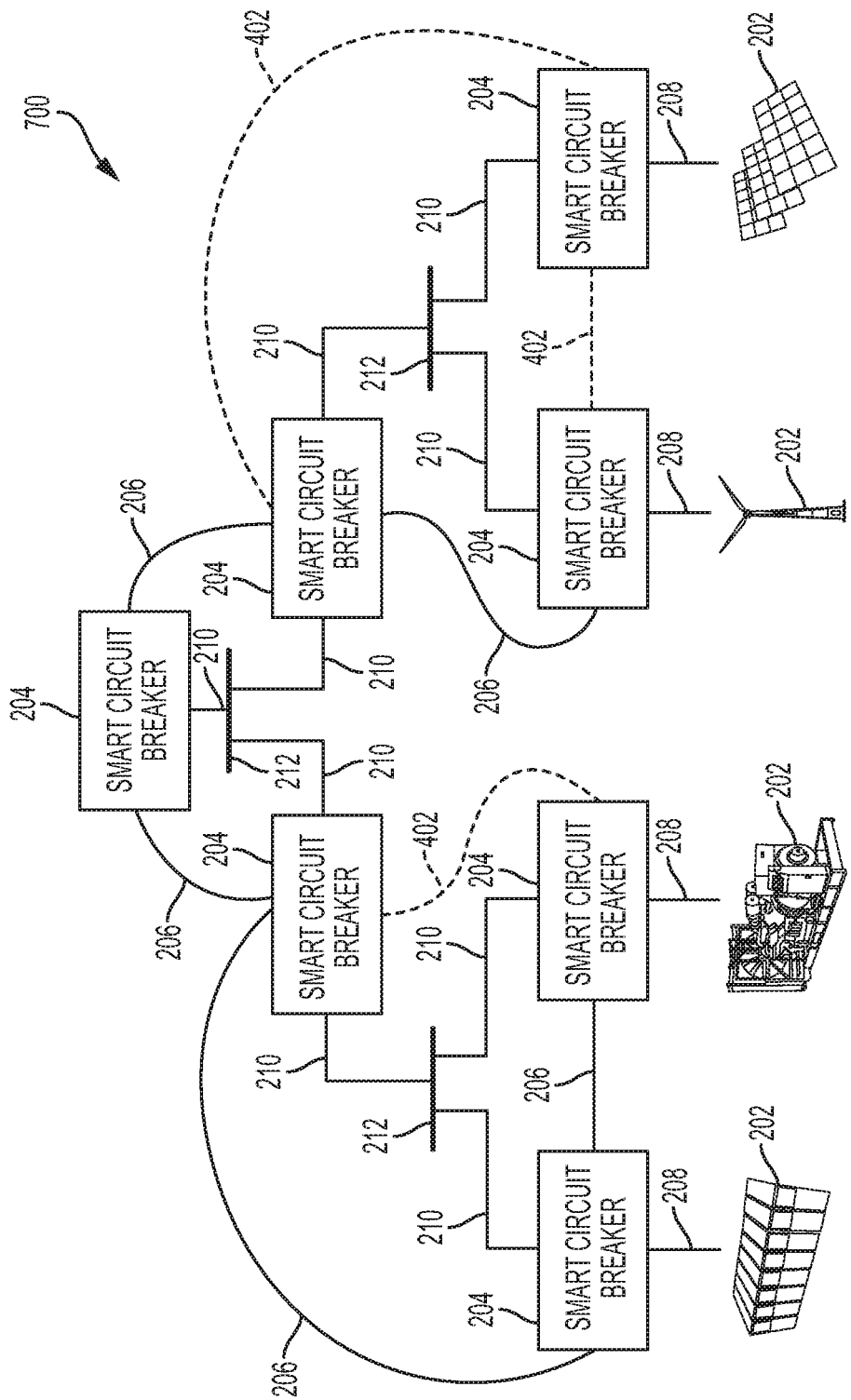
FIG. 7 is a schematic block diagram of a power system grid operating with limited communication between circuit breakers in accordance with one or more embodiments of the present invention.

Turning now to FIG. 7, a schematic block diagram of a power system grid 700 operating with limited communication between circuit breakers is generally shown in accordance with one or more embodiments of the present invention. The power system grid 700 of FIG. 7 represents the power system grid 400 of FIG. 4 after at least a subset of the communication channels 206 are operational and/or at least a subset of the power lines 210 are energized. In accordance with one or more embodiments of the present invention, once portions of the power system grid are energized some of the wireless communication channels (e.g., between the circuit breakers) may come back into operation. Then, the power system grid 700 can transition from a decentralized communication-free control mode (i.e., an exception operation mode) into a distributed centralized control scheme (i.e., a normal operation mode). The power system grid 700 shown in FIG. 7 includes: power generation units 202; smart circuit breakers 204; feeder power lines 208 connecting the power generation units 202 and the smart circuit breakers 204; lost, or non-functional wireless communication channels 402 between the smart circuit breakers 204; functional power lines 210; and power line connectors 212.

Figure 8:
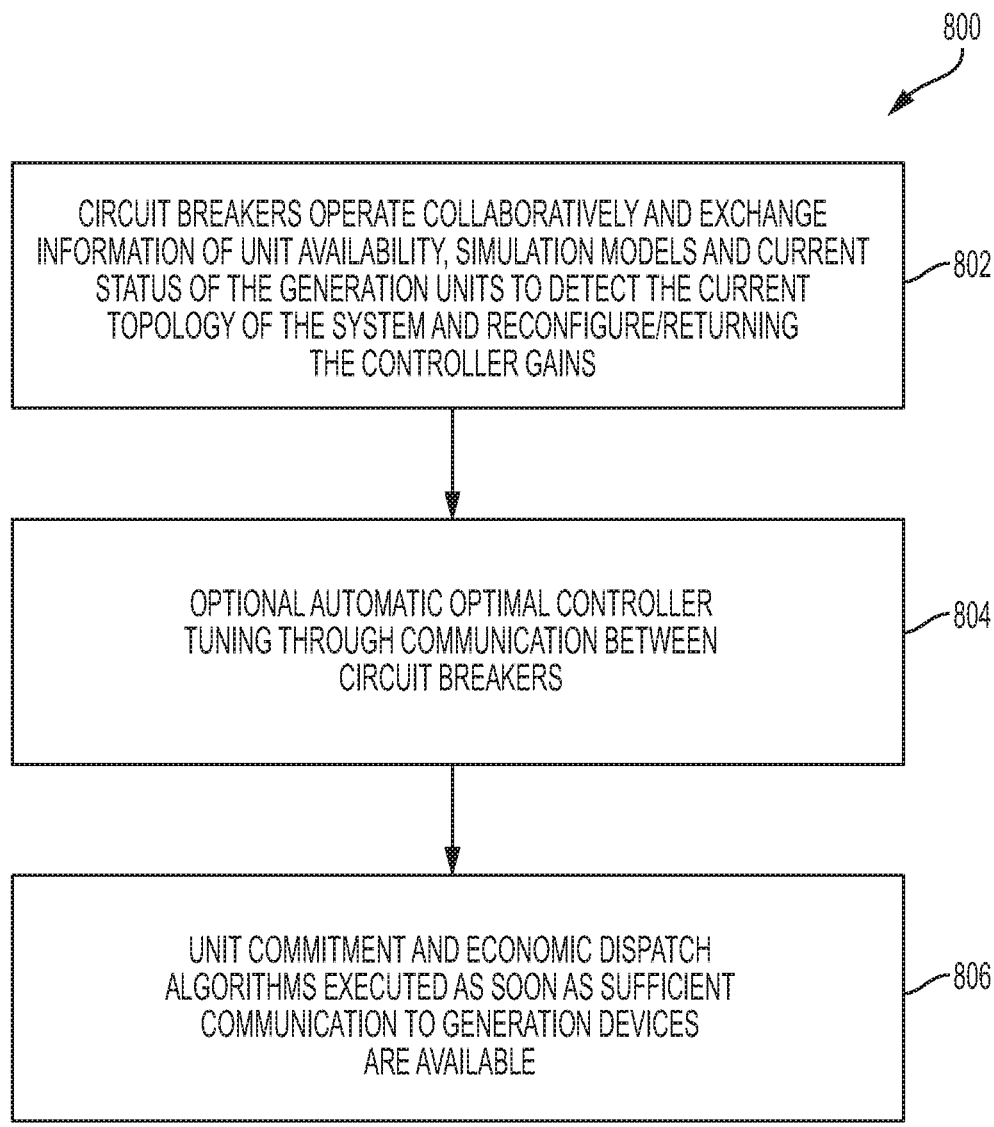
FIG. 8 is a flow diagram of a process performed by a circuit breaker operating with limited communication to other circuit breakers in accordance with one or more embodiments of the present invention.

Turning now to FIG. 8, a flow diagram 800 of a process performed by a circuit breaker, such as a smart circuit breaker 204 of FIG. 7, is generally shown in accordance with one or more embodiments of the present invention. At block 802, the circuit breakers that are in communication with each other operate collaboratively and exchange information about power generation unit availability, simulation models, and current status of power generation units to detect the current topology of the power system grid, such as power system grid 700 of FIG. 7, to reconfigure/retune the controller gains. The current topology is one of the post-event grid configurations modeled during normal operation, and its associated composite simulation model is utilized by the smart circuit breaker to restore the power system.

The automatic optimal controller tuning through communication between circuit breakers of block 804 is optional. In accordance with one or more embodiments of the present invention, the initial tuning is done via a look-up table approach with control parameters stored during normal operation as described previously with respect to FIG. 3. Advanced optimal controller tuning algorithms can be executed online to improve the performance. At block 806, power generation unit commitment and economic dispatch algorithms may be executed as soon as sufficient communication to power generation units is available.

Illustrative methods in accordance with example embodiments of the invention have been described above with reference to FIGS. 1, 3, 5, and 8. It should be noted that any given operation of the methods described in FIGS. 1, 3, 5, and 8 may be performed by one or more program modules or the like. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 9:
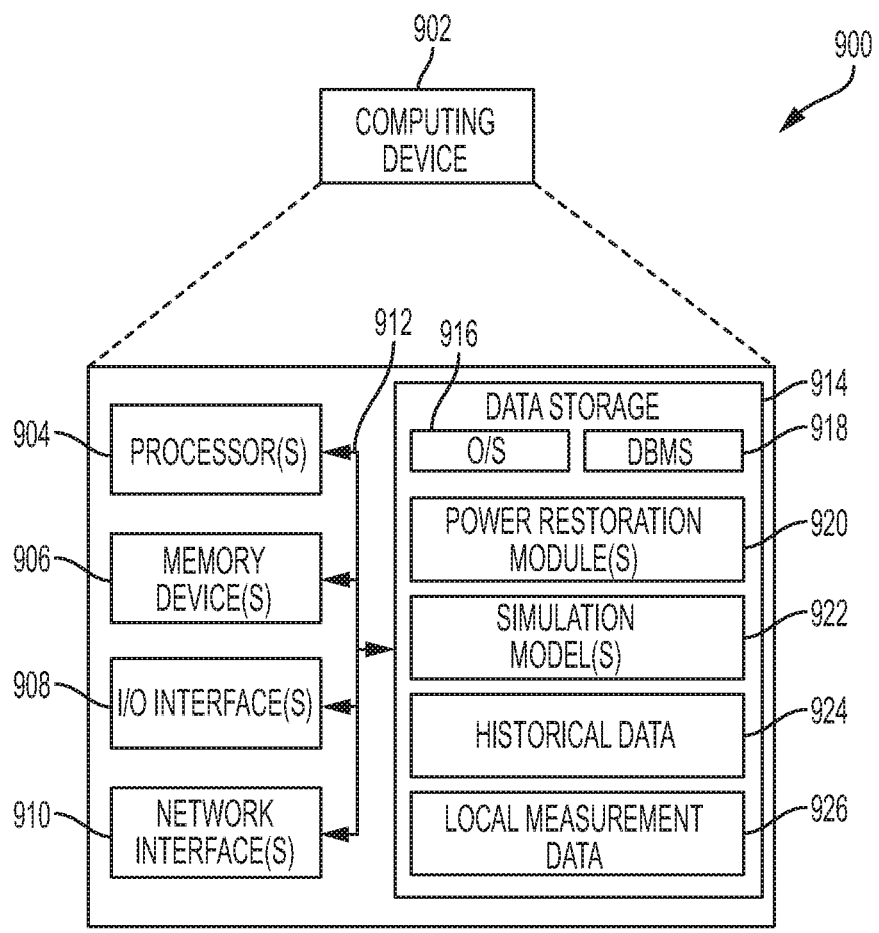
FIG. 9 is a schematic diagram of a computing device of a smart circuit breaker in accordance with one or more embodiments of the present invention.

Turning now to FIG. 9, a schematic diagram 900 of a computing device 902 of a smart circuit breaker is generally shown in accordance with one or more embodiments of the present invention. The computing device 902 in FIG. 9 can be utilized to implement all or a subset of the processing described above with reference to FIGS. 1, 3, 5, and 8. In accordance with one or more embodiments of the present invention, the computing device 902 is contained within a smart circuit breaker, such as a smart circuit breaker 204 of FIG. 1. Alternatively, the computing device 902 is implemented by any suitable computing device communicatively coupled to a circuit breaker including, without limitation, a server, a personal computer (PC), a tablet, a smartphone, or the like. While any particular component of the schematic diagram 900 may be described herein in the singular, it should be appreciated that multiple instances of any such component may be provided, and functionality described in connection with a particular component may be distributed across multiple ones of such a component.

In an illustrative configuration, the computing device 902 may include one or more processors (processor(s)) 904, one or more memory devices 906 (generically referred to herein as memory 906), one or more input/output ("I/O") interface(s) 908, one or more network interfaces 910, and data storage 914. The computing device 902 may further include one or more buses 912 that functionally couple various components of the computing device 902.

The bus(es) 912 may include at least one of a system bus, a memory bus, an address bus, or a message bus, and may permit the exchange of information (e.g., data (including computer-executable code), signaling, etc.) between various components of the computing device 902. The bus(es) 912 may include, without limitation, a memory bus or a memory controller, a peripheral bus, an accelerated graphics port, and so forth. The bus(es) 912 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 906 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 906 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 906 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 914 may include removable storage and/or non-removable storage including, but not limited to, magnetic storage, optical disk storage, and/or tape storage. The data storage 914 may provide non-volatile storage of computer-executable instructions and other data. The memory 906 and the data storage 914, removable and/or non-removable, are examples of computer-readable storage media (CRSM) as that term is used herein.

The data storage 914 may store computer-executable code, instructions, or the like that may be loadable into the memory 906 and executable by the processor(s) 904 to cause the processor(s) 904 to perform or initiate various operations. The data storage 914 may additionally store data that may be copied to memory 906 for use by the processor(s) 904 during the execution of the computer-executable instructions. Moreover, output data generated as a result of execution of the computer-executable instructions by the processor(s) 904 may be stored initially in memory 906 and may ultimately be copied to data storage 914 for non-volatile storage.

More specifically, the data storage 914 may store one or more operating systems (O/S) 916; one or more database management systems (DBMS) 918 configured to access the memory 906 and/or one or more external datastores; and one or more program modules, applications, engines, managers, computer-executable code, scripts, or the like such as, for example, one or more power restoration modules 920. Any of the components depicted as being stored in data storage 314 may include any combination of software, firmware, and/or hardware. The software and/or firmware may include computer-executable instructions (e.g., computer-executable program code) that may be loaded into the memory 906 for execution by one or more of the processor(s) 904 to perform any of the operations described earlier in connection with correspondingly named modules.

As shown in FIG. 9, the data storage 914 may further store various types of data utilized by components of the computing device 902 such as, but not limited to simulation models 922, historical data 924, and local measurement data 926. Any data stored in the data storage 914 may be loaded into the memory 906 for use by the processor(s) 904 in executing computer-executable instructions. In addition, any data stored in the data storage 914 may potentially be stored in an external datastore(s) and may be accessed via the DBMS 918 and loaded in the memory 906 for use by the processor(s) 904 in executing computer-executable instructions.

The processor(s) 904 may be configured to access the memory 906 and execute computer-executable instructions loaded therein. For example, the processor(s) 904 may be configured to execute computer-executable instructions of the various program modules, applications, engines, managers, or the like of the computing device 902 to cause or facilitate various operations to be performed in accordance with one or more embodiments of the disclosure. The processor(s) 904 may include any suitable processing unit capable of accepting data as input, processing the input data in accordance with stored computer-executable instructions, and generating output data. The processor(s) 904 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 904 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 904 may be capable of supporting any of a variety of instruction sets.

Referring now to other illustrative components depicted as being stored in the data storage 914, the O/S 916 may be loaded from the data storage 914 into the memory 906 and may provide an interface between other application software executing on the computing device 902 and hardware resources of the computing device 902. More specifically, the O/S 916 may include a set of computer-executable instructions for managing hardware resources of the computing device 902 and for providing common services to other application programs. In certain example embodiments, the O/S 916 may include or otherwise control the execution of one or more of the program modules, engines, managers, or the like depicted as being stored in the data storage 914. The 0/S 916 may include any operating system now known or which may be developed in the future including, but not limited to, any server operating system, any mainframe operating system, or any other proprietary or non-proprietary operating system.

The DBMS 918 may be loaded into the memory 906 and may support functionality for accessing, retrieving, storing, and/or manipulating data stored in the memory 906, data stored in the data storage 914, and/or data stored in external datastore(s). The DBMS 918 may use any of a variety of database models (e.g., relational model, object model, etc.) and may support any of a variety of query languages. The DBMS 918 may access data represented in one or more data schemas and stored in any suitable data repository. External datastore(s) that may be accessible by the computing device 902 via the DBMS 918 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 902, the input/output (I/O) interface(s) 908 may facilitate the receipt of input information by the computing device 902 from one or more I/O devices as well as the output of information from the computing device 902 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 902 or may be separate. The I/O devices may further include, for example, any number of peripheral devices such as data storage devices, printing devices, and so forth.

The I/O interface(s) 908 may also include an interface for an external peripheral device connection such as universal serial bus (USB), FireWire, Thunderbolt, Ethernet port or other connection protocol that may connect to one or more networks. The I/O interface(s) 908 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 902 may further include one or more network interfaces 910 via which the computing device 902 may communicate with other smart circuit breakers via one or more communication channels.

It should be appreciated that the program modules/engines depicted in FIG. 9 as being stored in the data storage 914 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 902 and/or other computing devices accessible via one or more networks, may be provided to support functionality provided by the modules depicted in FIG. 9 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 9 may be implemented, at least partially, in hardware and/or firmware across any number of devices.

It should further be appreciated that the computing device 902 may include alternate and/or additional hardware, software, or firmware components beyond those described or depicted without departing from the scope of the disclosure. More particularly, it should be appreciated that software, firmware, or hardware components depicted as forming part of the computing device 902 are merely illustrative and that some components may not be present or additional components may be provided in various embodiments. While various illustrative modules have been depicted and described as software modules stored in data storage 914, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the processes described with reference to FIGS. 1, 3, 5, and 8 may be performed by a computing device 902 having the illustrative configuration depicted in FIG. 9, or more specifically, by one or more program modules, engines, applications, or the like executable on such a device. It should be appreciated, however, that such operations may be implemented in connection with numerous other device configurations.

The operations described and depicted in the illustrative methods of FIGS. 1, 3, 5, and 8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1, 3, 5, and 8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, at a circuit breaker, an operating mode of the circuit breaker, the circuit breaker in a power system grid comprised of a plurality of circuit breakers and a plurality of power generation units, the circuit breaker one of the plurality of circuit breakers, the plurality of circuit breakers coupled to each other via a plurality of communication channels, and the operating mode one of a normal operating mode and an exception operating mode;
   based on determining that the operating mode is the normal operating mode:
      collecting, at the circuit breaker, data to parameterize a plurality of power system grid restoration scenarios;
      storing at the circuit breaker, simulation models for each of the plurality of circuit breakers;
      constructing at the circuit breaker, a composite simulation model based on the stored simulation models for each of the plurality of circuit breakers; and
      running controller tuning functions on the composite simulation model for each configuration of the plurality of circuit breakers; and
   based on determining that the operating mode is the exception operating mode:
      receiving, at the circuit breaker, measurement data including current and voltage data; and
      initiating, at the circuit breaker, one of the plurality of power system grid restoration scenarios, the power system grid restoration scenario selected based on the measurement data and the simulated controller tuning functions from the composite simulation model.

2. The method of claim 1, wherein the power system grid restoration scenario includes the circuit breaker remaining in an open state based at least in part on the measurement data indicating a short circuit.

3. The method of claim 1, wherein the power system grid restoration scenario includes the circuit breaker being in an open state based at least in part on the measurement data indicating a short circuit and the circuit breaker moving to a closed state based at least in part on updated measurement data indicating a balance between load and generation at the circuit breaker.

4. The method of claim 1, wherein the circuit breaker is in a closed state based at least in part on the measurement data indicating a balance between load and generation at the circuit breaker.

5. The method of claim 1, wherein the simulation models and the control parameters are stored at the circuit breaker.

6. The method of claim 1, wherein the status of the plurality of communication channels coupled to the circuit breaker is that none of the plurality of communication channels are functional and the power system grid restoration scenario comprises: operating the circuit breaker independently based at least in part on the measurement data, the simulation models, and the control parameters for the power system grid restoration scenario.

7. The method of claim 1, wherein the status of the plurality of communication channels coupled to the circuit breaker is that at least a subset but not all of the communication channels are functional and the power system grid restoration scenario comprises:
operating the circuit breaker collaboratively with at least one other circuit breaker via the at least a subset of the communication channels that are functional.

8. A system, comprising:
a circuit breaker in a power system grid comprised of a plurality of circuit breakers and a plurality of power generation units, the circuit breaker one of the plurality of circuit breakers, and the plurality of circuit breakers coupled to each other via a plurality of communication channels, the circuit breaker comprising:
one or more processors being responsive to non-transitory executable instructions for performing operations comprising:
determining an operating mode of the circuit breaker, the operating mode one of a normal operating mode and an exception operating mode;
based on determining that the operating mode is the normal operating mode:
collecting, at the circuit breaker, data to parameterize a plurality of power system grid restoration scenarios;
storing at the circuit breaker, simulation models for each of the plurality of circuit breakers;
constructing at the circuit breaker, a composite simulation model based on the stored simulation models for each of the plurality of circuit breakers; and
running controller tuning functions on the composite simulation model for each configuration of the plurality of circuit breakers; and
based on determining that the operating mode is the exception operating mode:
receiving measurement data including current and voltage data; and
initiating one of the plurality of the power system grid restoration scenarios, the power system grid restoration scenario selected based on the measurement data and the simulated controller tuning functions from the composite simulation model.

9. The system of claim 8, wherein the power system grid restoration scenario includes the circuit breaker remaining in an open state based at least in part on the measurement data indicating a short circuit.

10. The system of claim 8, wherein the power system grid restoration scenario includes the circuit breaker being in an open state based at least in part on the measurement data indicating a short circuit and the circuit breaker moving to a closed state based at least in part on updated measurement data indicating a balance between load and generation at the circuit breaker.

11. The system of claim 8, wherein the circuit breaker is in a closed state based at least in part on the measurement data indicating a balance between load and generation at the circuit breaker.

12. The system of claim 8, wherein the collecting comprises:
receiving, at the circuit breaker, simulation models of at least a subset of the power generation units in the power system grid; and
calculating, at the circuit breaker, control parameters for the circuit breaker for the plurality of power system grid restoration scenarios, the calculating based at least in part on the received simulation models.

13. The system of claim 12, wherein the simulation models and the control parameters are stored at the circuit breaker.

14. The system of claim 12, wherein the status of the plurality of communication channels coupled to the circuit breaker is that none of the plurality of communication channels are functional and the power system grid restoration scenario comprises:
operating the circuit breaker independently based at least in part on the measurement data, the simulation models, and the control parameters for the power system grid restoration scenario.

15. The system of claim 8, wherein the status of the plurality of communication channels coupled to the circuit breaker is that at least a subset but not all of the communication channels are functional and the power system grid restoration scenario comprises:
operating the circuit breaker collaboratively with at least one other circuit breaker via the at least a subset of the communication channels that are functional.

16. A computer program product comprising a storage medium readable by a processing circuit, the storage medium storing instructions executable by the processing circuit to cause a method to be performed, the method comprising:
determining, at a circuit breaker, an operating mode of the circuit breaker, the circuit breaker in a power system grid comprised of a plurality of circuit breakers and a plurality of power generation units, the circuit breaker one of the plurality of circuit breakers, the plurality of circuit breakers coupled to each other via a plurality of communication channels, and the operating mode one of a normal operating mode and an exception operating mode;
based on determining that the operating mode is the normal operating mode:
collecting, at the circuit breaker, data to parameterize a plurality of power system grid restoration scenarios;
storing at the circuit breaker, simulation models for each of the plurality of circuit breakers;
constructing at the circuit breaker, a composite simulation model based on the stored simulation models for each of the plurality of circuit breakers; and
running controller tuning functions on the composite simulation model for each configuration of the plurality of circuit breakers; and
based on determining that the operating mode is the exception operating mode:
receiving, at the circuit breaker, measurement data including current and voltage data; and
initiating, at the circuit breaker, one of the plurality of power system grid restoration scenarios, the power system grid restoration scenario selected based on the measurement data and the simulated controller tuning functions from the composite simulation model.

17. The computer program product of claim 16, wherein the power system grid restoration scenario includes the circuit breaker remaining in an open state based at least in part on the measurement data indicating a short circuit.

18. The computer program product of claim 16, wherein the power system grid restoration scenario includes the circuit breaker being in an open state based at least in part on the measurement data indicating a short circuit and the circuit breaker moving to a closed state based at least in part on updated measurement data indicating a balance between load and generation at the circuit breaker.

19. The computer program product of claim 16, wherein the circuit breaker is in a closed state based at least in part on the measurement data indicating a balance between load and generation at the circuit breaker.

\* \* \* \* \*